Figure 1:
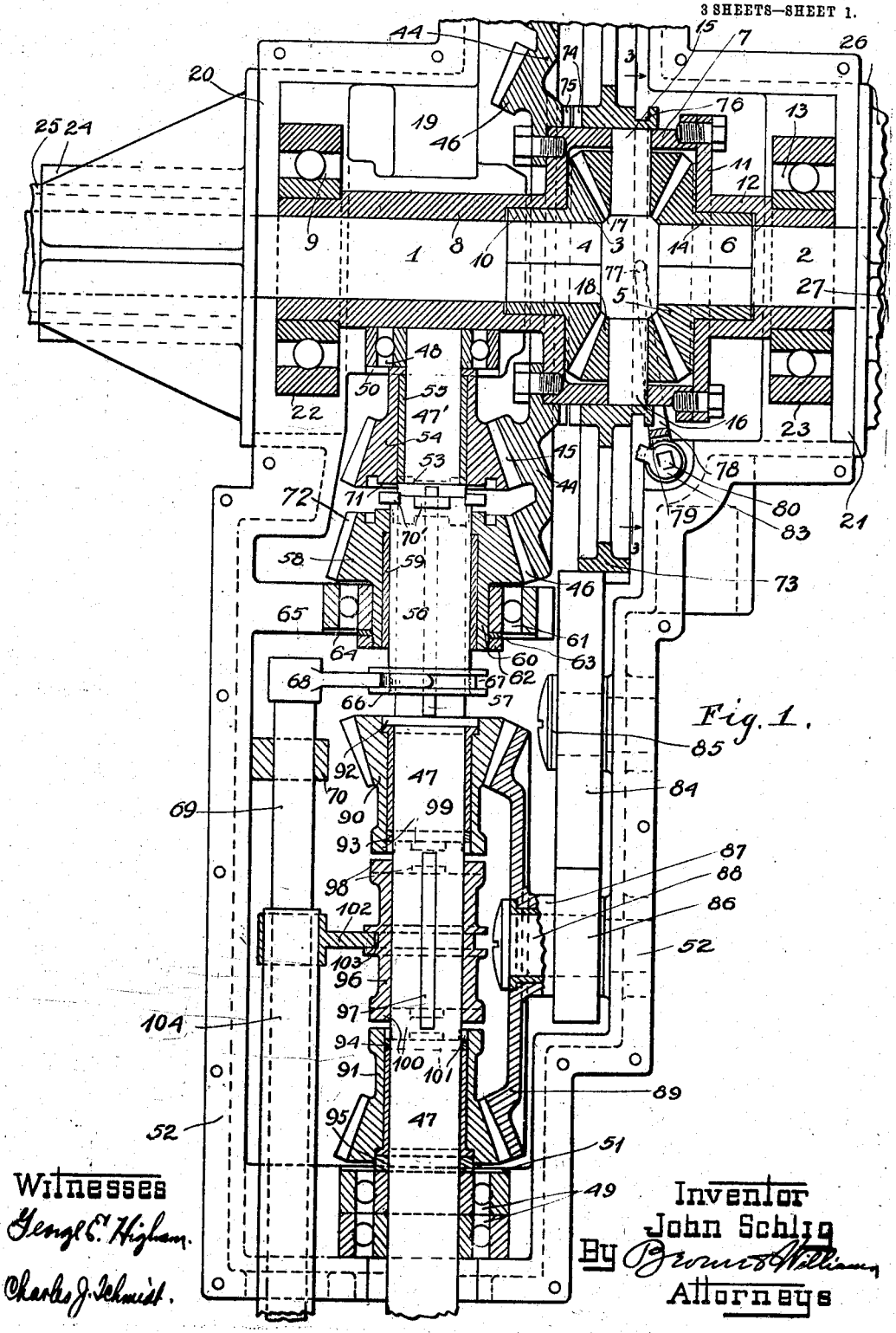

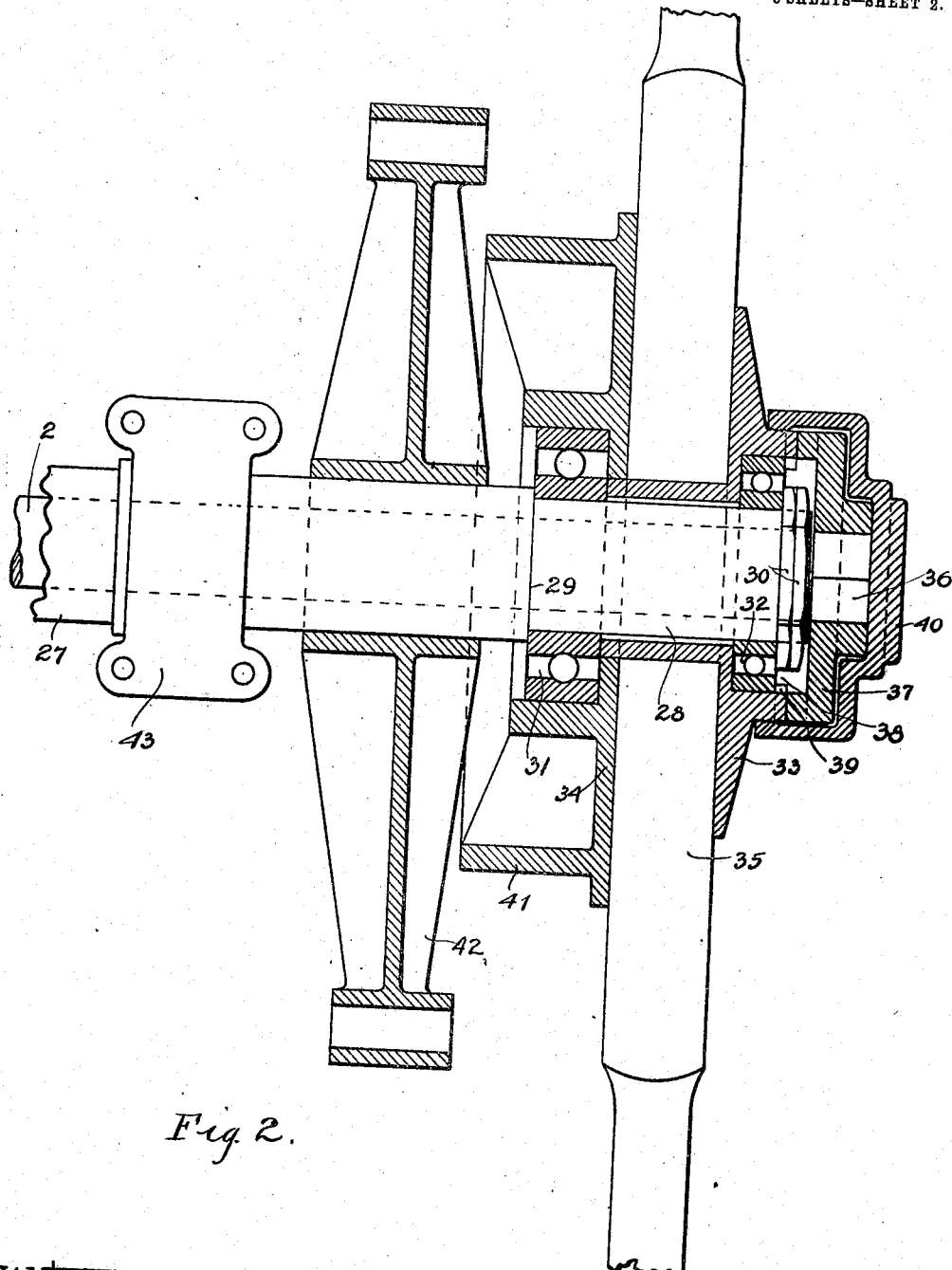

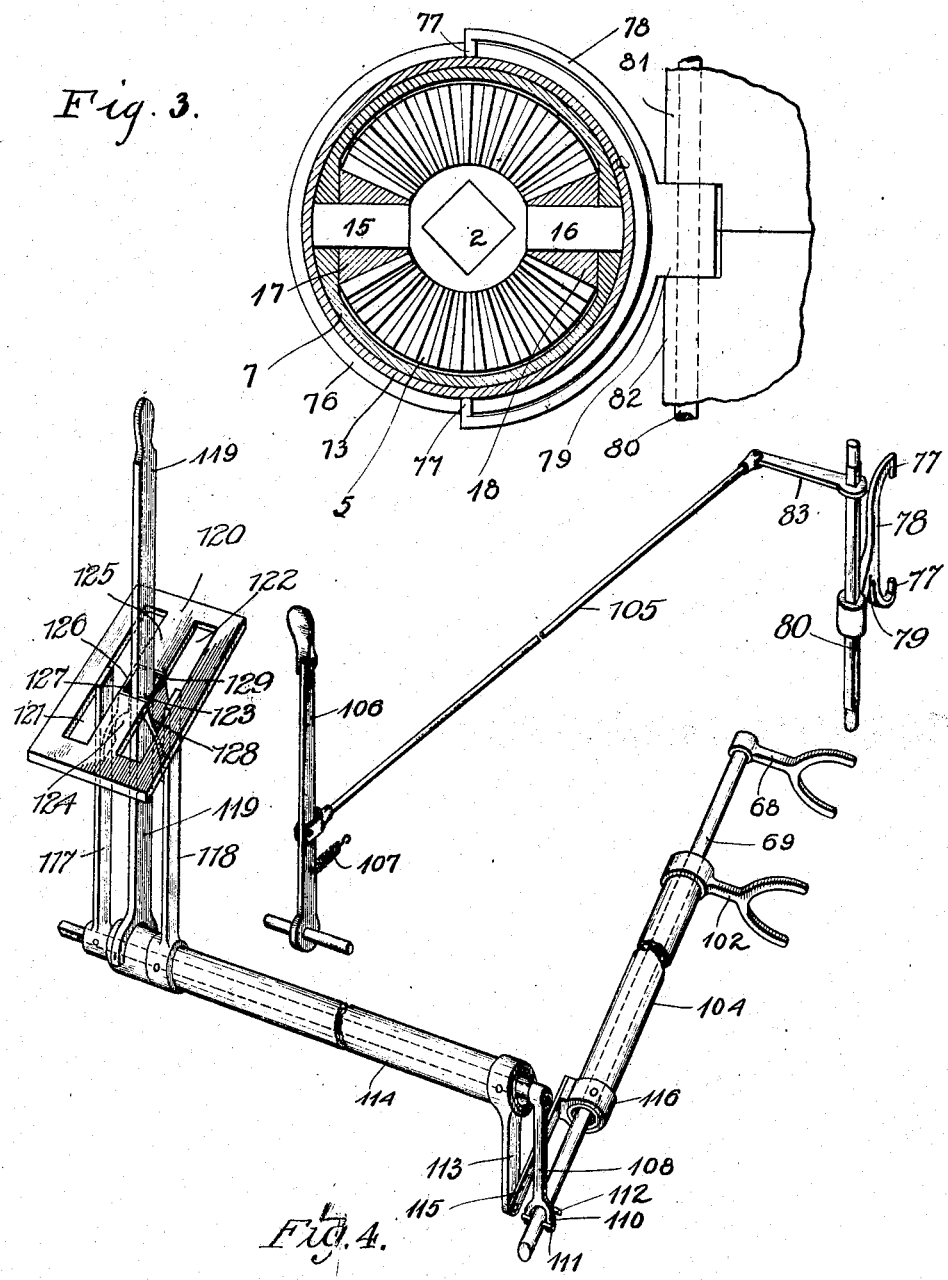

UNITED STATES PATENT OFFICE.

JOHN SCHLIG, OF CHICAGO, ILLINOIS.

TRANSMISSION SYSTEM.

No. 930,419.      Specification of Letters Patent.      Patented Aug. 10, 1909.

Application filed January 20, 1908. Serial No. 411,691.

*To all whom it may concern:*

Be it known that I, JOHN SCHLIG, citizen of the United States, residing at Chicago, in the county of Cook and State of Illinois, have invented a certain new and useful Improvement in Transmission Systems, of which the following is a full, clear, concise, and exact description, reference being had to the accompanying drawings, forming a part of this specification.

My invention relates to transmission systems and controlling mechanism therefor, and my invention is particularly adaptable in the automobile field.

In my co-pending application, Serial No. 352,460, filed January 15, 1907, I have shown and described a transmission system in which there is direct gearing connection between the engine shaft and the axle, the gears being always in mesh and provided with clutching mechanism so that the driving shaft can be connected to cause three speeds ahead and one reverse. Clutch-controlling lever mechanism is also shown for putting into condition the various clutch mechanisms.

My present invention may be considered as an improvement over the invention disclosed in this referred to application, the object being to secure greater compactness, greater simplicity and more efficient operation.

I have shown my invention in the accompanying drawings, in which—

Figure 1 is a plan view of the transmission system, the top half of the inclosing casing being removed and parts of the gearing mechanism being shown in section; Fig. 2 is a view partly in section showing the connection of the driving wheels with the axle which is driven by the transmission system; Fig. 3 is a sectional view taken on plane 3—3, Fig. 1; and Fig. 4 is a perspective view showing the clutch mechanism controlling lever system.

1 and 2 represent the two parts of the driving axle. A beveled gear 3 is mounted on the squared inner end 4 of the axle section 1, and a beveled gear 5 is mounted on the squared inner end 6 of the axle section 2. These beveled gears form part of a differential system and are inclosed by the housing 7 from which extends to the left a sleeve 8 encircling the shaft section 1 and whose end journals in a ball bearing 9. The hub 10 of the beveled gear 3 bears in the right end of this sleeve as shown. The right side 11 of the differential casing is bolted to the main housing 7 and extending therefrom toward the left is the sleeve 12 whose right end journals in the ball bearing 13 and whose inner end forms a bearing for the hub 14 of the beveled gear 5. Mounted on shafts 15 and 16 extending inwardly from the housing 7 are the intermediate differential pinions 17 and 18 meshing with the main gears 3 and 5.

My entire transmission system is inclosed in a housing comprising upper and lower similar halves which are bolted together. The part of the housing for the mechanism thus far described is cylindrical and concentric with the axle and comprises the cylindrical body part 19 formed of upper and lower similar halves and the end sections 20 and 21. The ball bearing 9 rests in a cylindrical pocket 22 formed in the left end of the housing 19, while the ball bearing 13 rests in the cylindrical pocket 23 formed in the right end of the housing 19. Extending from the left wall 21 is the hub 24 in which is secured the end of a tube 25. From the right wall 20 extends the hub 26 in which is secured the left end of a tube 27. The right end of this tube 27 is shown in Fig. 2 and terminates in a reduced section 28 to leave a shoulder 29 and the end section 28 is threaded for receiving the nuts 30. A ball bearing 31 surrounds the section 28 and engages against shoulder 29, and a ball bearing 32 surrounds the end of the section 28, and between these ball bearings is clamped the supporting hub sections 33 and 34 between which are bolted the spokes 35 forming part of the vehicle wheel. The nuts 30 being drawn up, the wheel is firmly secured in place about the end section 28 and turns freely on the ball bearings 31 and 32. The shaft section 2 extends centrally through the tubes 27 and 28, its square end 36 being engaged by a clutch collar 37 which on its inner end has teeth 38 for engaging and locking with teeth 39 extending from the hub section 33. In this manner rotation of the axle section 2 is transmitted to the wheel. A cap 40 has threaded engagement with the hub section 33 and holds the clutch collar 37 in locking engagement with the hub section 32. Upon removal of this cap 40 the entire axle section 2 may be withdrawn. Formed on the hub section 34 is a brake rim 41 and mounted on the tube 27 is the brake strap holding frame 42, while just within the braking mechanism is shown a spring block 43 on which the vehicle springs rest and are secured. The left vehicle wheel is clutched to the end of axle section 1 in exactly the same manner as shown in Fig. 2. The axle sections are thus entirely free from weight and serve only as a means for transmitting rotation to the wheels, the strains due to the weight of the vehicle being borne by the structure comprising the tubes 25, 27, hubs 24, 26, and the inclosing housing 19.

Bolted to the differential housing 7 is the main driving gear 44 which has the outer beveled gearing surface 45 and the inner beveled gearing surface 46. Any rotation of this main gear will be transmitted to the differential housing and then differentially to the axle sections through the differential gearing mechanism.

Extending forwardly at right angles to and in the same plane with the axle is the engine driving shaft 47, whose rear end 47' is journaled in the ball bearing 48 and whose front end is journaled in ball bearings 49. The ball bearing 48 rests in a cylindrical pocket 50 formed in the inclosing housing, and the bearings 49 rest in a cylindrical pocket 51 formed at the front end of the inclosing housing 52 composed of upper and lower similar halves adapted to be bolted together. The rear end 47' is of reduced diameter to leave a shoulder 53 between which and the bearing 48 is confined the beveled driving pinion 54 which is always in mesh with the inner bearing surface 46 of the main gear, the driving pinion being lined by bushing 55, as shown. Directly in front of this driving pinion the clutch sleeve 56 is mounted on the driving shaft, a key 57 engaging the shaft and the sleeve, causing rotation of said sleeve with the driving shaft but allowing longitudinal reciprocation of the sleeve.

Journaled on the sleeve is the driving pinion 58 which always meshes with the gearing surface 45 on the main gear. This driving pinion is lined with a bushing 59 and its hub 60 is secured to the inner member of a ball bearing 61 between the pinion body and the nut 62 engaging the threaded end of the web, a washer 63 intervening. The ball bearing 61 rests in a pocket 64 formed in the web or wall 65 extending from the housing halves, and this ball bearing also serves to support the middle section of the engine driving shaft. Threaded to the front end of the clutch sleeve is a clutch collar 66 in whose groove 67 engages the fork frame 68 extending from the end of the clutch rod 69 which bears in lug 70 and in the front end of the inclosing housing. At the rear end of the clutch sleeve are clutch teeth 70' which, when the sleeve is moved rearwardly, engage with clutch teeth 71 extending from the driving pinion 54 and which, when the sleeve is moved forwardly, engage with clutch teeth 72 extending rearwardly from driving pinion 58. Alternate clutch teeth on the sleeve and the driving pinions are shorter so that the teeth will quickly come into clutching engagement upon movement of the clutch sleeve. The driving shaft 47 is driven always in one direction, and normally the driving pinions 54 and 58 are disconnected therefrom. When the clutch sleeve is moved rearwardly the driving shaft is connected in driving relation with pinion 54 and the main gear, and when the clutch sleeve is moved forwardly the driving shaft is connected in driving relation with the pinion 58 and the main gear, these pinions being thus independently adapted for driving connection with the driving shaft. The high speed pinion 54 being confined between the rear bearing 48 and the shoulder 53, is always held rigidly and in perfect gearing relation with the gearing surface 46. The pinion 58 is held true by the bearing 61 and the clutch sleeve and always maintains perfect gearing relation with the main gear. This construction and arrangement just described enables me to bring the driving pinions close together and close to the axle so that the diameter of the main gear can be very materially reduced, thus greatly increasing the clearance between the main gear and the roadway.

Journaled on the cylindrical differential housing 7 is a secondary driving gear 73 from whose left face extend clutch teeth 74 adapted for engaging with clutch teeth 75 extending from the web of the main gear, while in the right end of the gear hub is formed a groove 76. In this groove engage the ends 77 of the fork frame 78 supported at the end of an arm 79 which is secured to a shaft 80. The ends of this shaft journal in bearing lugs 81 and 82 formed in the upper and lower halves of the inclosing casing, the arm 79 being secured to the shaft between these bearing lugs, as best shown in Fig. 3. Upon rotation of this shaft the fork 78 is swung to cause the secondary gear to be carried into and out of clutching engagement with the main gear and differential housing. Secured to the upper end of the shaft outside the transmission system housing is the actuating arm 83 whose connection with the clutch controlling lever system will be described later.

The secondary driving gear is always in mesh with a transmission gear 84 which is pivoted on the stud shaft 85 secured to and extending inwardly from the right wall of the main housing, and this transmission gear always meshes with a smaller transmission gear 86 which is formed on the hub 87 which is pivoted on the stud shaft 88 secured to and extending inwardly from the right wall of the main housing. At the inner end of this hub 87 is the beveled gear 89 which is always in mesh with driving pinions 90 and 91 pivoted on the driving shaft. The pinion 90 is confined between the collars 92 and 93 on the driving shaft, and the pinion 91 is confined between collars 94 and 95 on the driving shaft. Between the pinions is the clutch sleeve 96 which, by virtue of key 97, must rotate with the driving shaft but is free for longitudinal movement thereon. At the rear end of this sleeve are clutch teeth 98 for engaging with clutch teeth 99 on pinion 90, and at the front end of the sleeve are clutch teeth 100 for engaging with clutch teeth 101 on the pinion 91. Thus, when the clutch sleeve is moved rearwardly the driving shaft is connected in driving relation with the pinion 90 and through the gears 89, 86 and 84 with the secondary gear 78, and if the secondary gear has been clutched to the main gear the driving shaft will be in driving relation with the axle. If the clutch sleeve 96 is moved forwardly the driving shaft will be connected in driving relation with the pinion 91 and through the various gears with the secondary gear and the axle. The driving shaft rotates in the direction of the arrow, and pinions 54 and 58 when clutched to the driving shaft will cause forward rotation of the axle and vehicle. If the pinion 91 is clutched to the driving shaft the axle will be driven forwardly with slow speed, while if the pinion 90 is clutched to the driving shaft the axle will be driven in reverse direction with slow speed. For sliding the clutch sleeve 96 a fork frame 102 engages in the groove 103 formed in the sleeve and is connected with the clutch tube 104 which encircles the clutch rod 69. Thus, the vehicle can be driven ahead with three different speeds and in reverse direction with slow speed.

In Fig. 4 I have shown a controlling lever system by means of which the various clutch members are controlled and locked. The arm 83 before referred to, which connects with the fork frame 78 controlling the secondary driving gear, connects through a rod 105 with a foot lever 106 suitably pivoted at its lower end to some part of the vehicle frame, a spring 107 normally tending to hold this foot lever in a rearward position so that normally the fork frame 78 is swung to hold the secondary gear from clutching relation with the main gear, the teeth of this gear, however, still remaining in mesh with the transmission gear 84. When this foot lever is swung forwardly the shaft 80 is turned and the fork frame swung to move the secondary driving gear into clutching engagement with the main gear. The clutch rod 69 at its front end has pivotal connection with the end of an arm 108 which is secured to a horizontal rod 109. This connection may be made as shown, the arm 108 terminating in a fork 110 whose ends engage between two sets of pins 111, 112 through the rod 69, so that upon rotation of the rod 109 the rod 69 will be moved longitudinally. The end of clutch rod or tube 104 has pivotal connection with the end of arm 113 secured to the end of a horizontal tube 114 surrounding the rod 109. This connection may be by means of a link 115 connecting with arm 113 and pivoted to the collar 116 at the end of tube 104. Rotation of tube 114, therefore, will cause longitudinal movement of tube 104. Secured to and extending upwardly from the other end of rod 109 is a lever 117 and secured to and extending upwardly from the other end of tube 114 is the lever 118. Pivoted to the rod 109 to swing between the levers 117 and 118 is the main controlling lever 119. In the vehicle floor is a locking plate 120 having two longitudinal slots 121, 122 and a central transverse slot 123 connecting the longitudinal slots to leave locking tongues 124 and 125. The main controlling lever 119 normally extends through the transverse slot to be locked between the tongues 124, 125. Lever 117 extends through slot 121 and lever 118 extends through slot 122.

Secured to the upper end of lever 117 is spring plate 126 whose sides are bent over to form a locking groove 127. Secured to the upper end of lever 118 is a spring plate 128 whose sides are bent over to form a U-shaped locking groove 129. The upper end of spring plate 126 normally engages in the end of transverse slot 123 to be locked between the tongues 124 and 125, while spring frame 128 normally engages in the end of this transverse groove to be also locked between the locking tongues. Thus, normally all the levers are locked. These levers are at the front end of the vehicle, and if it is desired to start the vehicle on slow speed the foot lever 106 is first actuated to cause clutching of the secondary gear with the main gear and then the main lever is moved toward the left to engage in locking groove 129 and to move the spring frame 128 out of the transverse slot and into the longitudinal slot 122, the main lever also entering this slot, whereupon the main lever is given a rearward rotation to the rear end of slot 122 to carry with it the spring frame 128 and lever 118, thereby causing rotation of sleeve 114. This rotation is transferred through arm 113 and link 115 to tube 104, which tube is moved to carry the clutch sleeve 96, engaged by fork 102, into clutching engagement with driving pinion 91, and the rotation transferred through the various transmission gears to the secondary driving gear will cause slow forward movement of the vehicle. If it is desired to travel in a reverse direction, the main lever after having been moved sidewise into slot 122 is rotated forwardly and tube 104 will be moved in a rearward direction to clutch driving pinion 90 to the driving shaft. It is usual, however, on ordinary roadways, to start the vehicle on the second speed and the main lever is first moved toward the right to release itself and the lever 117 from the locking slot 123, whereupon the main lever is rotated toward the rear to cause rotation of rod 109 and forward movement of rod 69 to move the clutch sleeve 56 to connect driving pinion 58 with the driving shaft. To throw in the higher speed the main lever should be rotated forwardly to cause rearward movement of rod 69 and connection of driving pinion 54 with the driving shaft. With this arrangement it is impossible for any conflicts to occur between the various driving gears. If the main lever is in slot 121 to connect in either of the pinions 54 or 58, it is impossible for pinions 90 or 91 to become connected with the driving shaft as lever 108 is locked in its normal position. It will be impossible, after having clutched in either of pinions 54 or 58, to clutch in either of pinions 90 or 91 unless the main lever is brought back from slot 121 into the locking slot and then into slot 122, but when the main lever is thus brought back lever 117 must fall and become locked in its neutral position in which the pinions 54 and 58 will be uncoupled from the driving shaft. In other words, it is impossible for any driving pinion to be connected in for service without first causing disconnection of all other driving pinions. This being the fact, the secondary gear may be clutched in at any time upon movement of foot lever 106 without causing conflict. Supposing this gear were clutched in and the main lever moved to connect in either gear 54 or 58; upon rotation of the main gear the secondary gear would, of course, rotate and with it the various transmission gears and the pinions 90 and 91, but these pinions 90 and 91 are disconnected from the driving shaft as the clutch sleeve between them is locked in its normal position by the locking of lever 118 in its normal position. The secondary gear could, in fact, be rigidly connected to the main gear without causing interference in my system, but the various transmission pinions would then have to rotate idly and be subject to a great deal of unnecessary wear besides being apt to cause more or less noise. The clutching means are, therefore, provided to disconnect the pinions and to prevent their continuous operation. Under the average conditions of operation and for the greater part of the travel of the vehicle, only the second and high speeds are used, and these are under the control of a single lever.

When the two halves of the inclosing housing are bolted together the housing can be filled with oil and all the bearing surfaces continuously well lubricated.

I do not wish to be limited to the details of construction as I have shown and described them, as changes and modifications are possible which will still come within the scope of my invention.

I desire to secure the following claims by Letters Patent—

1. In a transmission system of the class described, the combination of an axle to be driven, a main driving gear secured to the axle, a secondary driving gear concentric with the axle and normally out of driving relation therewith, a drive shaft continuously driven in one direction, forward drive pinions on said drive shaft meshing with the main gear, forward and reverse drive pinion mechanism on the drive shaft, transmission gearing connecting the forward and reverse drive pinion mechanism with the secondary driving gear and always in mesh therewith, clutch mechanism for controlling the connection of the drive pinions with the drive shaft to cause different speeds of forward rotation of the main gear, clutch mechanism controlling the connection of the forward and reverse drive pinions with the drive shaft to cause either forward or reverse rotation of the secondary gear, a common manually-operative lever for controlling said clutch mechanisms, additional clutch mechanism controlling the connection of the secondary gear in driving relation with the axle, and foot lever mechanism for controlling said additional mechanism.

2. In a transmission system of the class described, the combination of an axle to be driven, a main drive gear secured to the axle, a secondary drive gear concentric with the axle and adapted for clutching engagement with the main drive gear, a drive shaft continuously driven in one direction, forward drive pinions on said shaft engaging the main drive gear, a reverse drive pinion on said shaft, transmission gearing always in mesh with said reverse drive pinion and said secondary drive gear, and means for causing bodily movement of the secondary drive gear into clutching engagement with the main drive gear, whereby rotation of said secondary drive gear will be transmitted to the axle.

3. In a transmission system of the class described, the combination of an axle to be driven, a main drive gear secured to the axle, a secondary drive gear concentric with the axle and adapted for clutching engagement with the main drive gear, a drive shaft continuously driven in one direction, forward drive pinions on said shaft engaging the main drive gear, a reverse drive pinion on said shaft, transmission gearing always in mesh with said reverse drive pinions and said secondary drive gear, clutch mechanism for controlling the connection of the reverse drive pinion with the shaft, and foot operable means for causing movement of the secondary drive gear into clutching engagement with the main drive gear, whereby rotation of said secondary drive gear will be transmitted to the axle.

4. In a transmission system, of the class described, the combination of an axle to be driven, a main driving gear secured to the axle, a secondary drive gear adjacent the main gear and adapted for direct clutching engagement therewith, a driving shaft at right angles to the axle, driving pinions on said driving shaft having connection with the main driving gear, clutching means for connecting said driving pinions in driving relation with the driving shaft, a reverse driving pinion on said driving shaft, transmission gearing always in mesh on said driving reverse pinion and the secondary driving gear, clutching means for clutching the reverse pinion in driving relation with the driving shaft, and additional clutching means for bodily moving the secondary driving gear into clutching engagement with the main driving gear.

In testimony whereof, I hereunto subscribe my name this 13th day of January, A. D. 1908.

JOHN SCHLIG.

Witnesses:
CHARLES J. SCHMIDT,
GEORGE E. HIGHAM.